United States Patent [19]

Baals et al.

[11] Patent Number: 5,373,551
[45] Date of Patent: Dec. 13, 1994

[54] SELECTABLE DISPLAY FOR A TELEPHONE TERMINAL

[75] Inventors: Kimberly A. Baals, Matawan; Kathleen J. Chylinski, Bridgewater; Darren A. Kall, Highland Park; Robert Mitchell, Aberdeen; Gary C. Smith, Freehold, all of N.J.

[73] Assignee: AT&T Corp., Murray Hill, N.J.

[21] Appl. No.: 427

[22] Filed: Jan. 4, 1993

[51] Int. Cl.⁵ .................... H04M 1/21; H04M 1/02
[52] U.S. Cl. ................... 379/110; 379/355; 379/388; 345/172
[58] Field of Search ............... 379/355, 356, 357, 201, 379/368, 387, 388, 389, 396, 110, 96; 345/172, 146

[56] References Cited

U.S. PATENT DOCUMENTS

| | | |
|---|---|---|
| 3,292,489 | 12/1966 | Johnson et al. ............. 340/712 |
| 4,291,198 | 9/1981 | Anderson et al. ........... 379/357 |
| 4,431,870 | 2/1984 | May et al. ................... 379/357 |
| 4,481,382 | 11/1984 | Villa-Real ................... 379/61 |
| 4,782,521 | 11/1988 | Bartlett et al. ............. 379/354 |
| 4,823,311 | 4/1989 | Hunter et al. .............. 345/172 |
| 4,860,339 | 8/1989 | D'Agosto, III et al. ...... 379/110 |
| 4,885,580 | 12/1989 | Noto et al. ................. 379/354 |
| 4,897,866 | 1/1990 | Majmuder et al. .......... 379/396 |
| 4,932,022 | 6/1990 | Keeney et al. .............. 379/96 |
| 4,991,199 | 2/1991 | Parekh et al. .............. 379/96 |

OTHER PUBLICATIONS

Canon Navigator Desktop Office "The World's First Desktop Office is Here" Canon Inc. 1990; Dec. 30, 1990.

Primary Examiner—James L. Dwyer
Assistant Examiner—Scott L. Weaver
Attorney, Agent, or Firm—Samuel R. Williamson

[57] ABSTRACT

A telephone terminal configured to provide a personalized user selectable feature which is displayed whenever the telephone terminal display is returned to an idle state from accessing other available features on the telephone terminal. Any of the available features on the telephone terminal may be designated as the personalized user selectable feature. A user may, for example, select a feature in the terminal that he or she uses the most as the personalized user selectable feature. Rapid movement to and execution of this user selectable feature from any of the other features in the telephone terminal is thus facilitated.

6 Claims, 3 Drawing Sheets

SELECTABLE DISPLAY FOR A TELEPHONE TERMINAL

BACKGROUND OF THE INVENTION

1. Technical Field

This invention is directed to telephone display arrangements and more particularly to a display configurable by a user at a telephone terminal.

2. Description of the Prior Art

Current wends in the design of telephone terminals indicate that more of telephone functionality increasingly is being integrated into the telephone display. For example, information as to the features available on the display has migrated from LEDs to the display. Also, local additions such as directories, status inspection, incoming caller information etc., are all migrating to and accessible through the display.

When a local or network feature is accessed through the display, this accessed feature continues to be displayed in many currently available telephone terminals. Other currently available telephone terminals default to a feature that the manufacturer has selected as the most logical to be displayed. A manufacturer may, for example, choose the time and date for inclusion on the display or the main softkey menu when the display is returned to idle. Thus once a user completes accessing a feature, the currently available telephone terminals either continue to display the accessed feature or default to the feature selected by the manufacturer of the telephone terminal. As a result, the user unfortunately is not able to select another more desirable default feature when he or she completes accessing other features on the telephone terminal.

SUMMARY OF THE INVENTION

The prior art problem is solved in accordance with the present invention by providing a user of a telephone terminal with a user selectable feature which is displayed when the telephone terminal display is returned to the idle state from accessing one of the available features on the telephone terminal.

In preferred embodiments, a user may select a feature that he or she uses the most and exit to this feature from any other feature in the telephone terminal. The user similarly may select the feature that he or she uses first when entering softkeys such as, for example, a list or directory entries to call. The user also may select the feature that he or she used when last exiting the softkeys such as, for example, the lock feature. Finally the user may elect to have the display blank so that when the softkeys on the terminal are not being accessed, nothing will be displayed on the display of the telephone terminal.

BRIEF DESCRIPTION OF THE DRAWING

This invention and its mode of operation will be more clearly understood from the following detailed description when read with the appended drawing in which.

DETAILED DESCRIPTION

Figure 1:
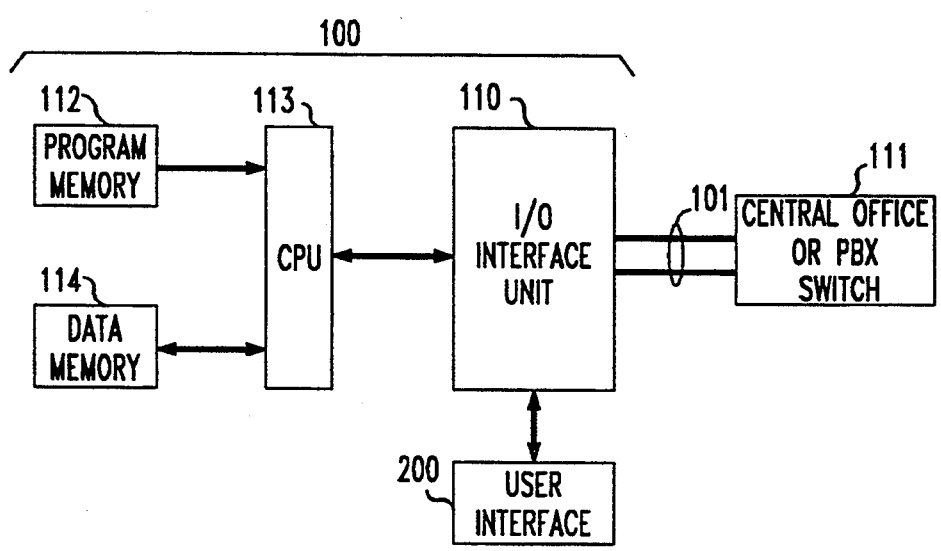
FIG. 1 is a block diagram of a telephone terminal useful in describing the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
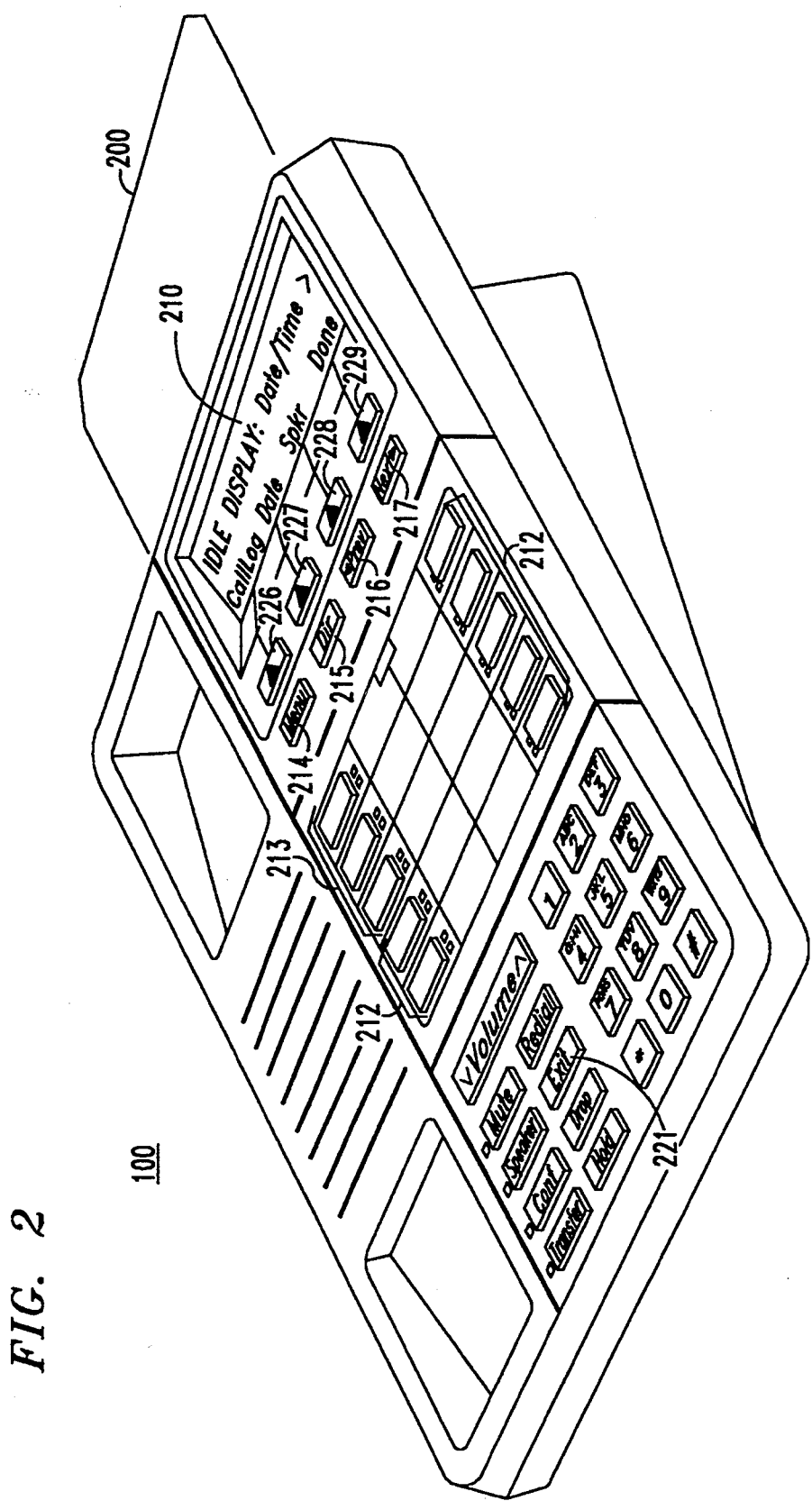
FIG. 2 illustrates the telephone terminal of FIG. 1 including a user interactive display, in accordance with the present invention.

With reference to FIG. 2, and in accordance with the invention, the user interface 200 allows the user of the telephone terminal 100 to configure a user interactive display 210 for accessing a feature that he or she desires to use first when entering softkeys. The user interface 200 comprises the user interactive display 210, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prey", and "Next>". The Menu button 214 is used to configure the terminal to the local softkey state. Similarly, the Dir button 215 also configures the terminal to the local softkey state, and also gives the user quick access to a local directory stored in the terminal with the first few entries appearing on the display. The <Prey and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229. Also the next button 217 could be used in the switch feature state, for example, to display the next entry in the directory query feature.

The labels and functions of the softkeys 226 through 229 appear on the associated display 210. The label or function for each of these keys changes dynamically as the user performs functions and makes selections via these softkeys.

While the embodiment of the present invention is described as being incorporated into a telephone terminal, it should be recognized that the present command-operated terminal could be utilized in a computer or other program-controlled system. Since such systems utilize a variety of hardware and programing techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification describes the operation of the present invention using the telephone terminal 100 shown in both FIGS. 1 and 2 together with the display screen flow chart of FIG. 3, which taken together describe the logical steps and the various parameters required to implement the present invention.

In accordance with the invention, users of the telephone terminal are able to go to a preferred display screen with one button press on the telephone terminal. Depending upon the level of functionality provided at the telephone terminal, the interactive display 210 may provide dozens, perhaps even hundreds of different screens to a user. Some of these screens are used only occasionally, such as those screens providing brief status messages. Other screens are used frequently or are displayed for prolonged periods. Examples of the latter include entries from the local directory or various feature menus such as the menu providing a date and time screen. Since different users will have different preferences and diverse needs as to which screen or screens are most important, a user may simply select the feature screen of choice and exit to the feature provided by this screen from any other feature in the telephone terminal.

When the user initially activates the telephone terminal, he or she is informed via an "IDLE DISPLAY" or main feature menu screen of the availability of a user selectable feature screen for interactive display 210. This user selectable feature screen is displayed when the telephone terminal display is returned to the idle state from accessing one of the features available on the telephone terminal. The user also is prompted via this main menu screen to choose a personalized user selectable feature screen for display when the telephone terminal display is returned to its idle state. Such a main feature menu screen is illustrated in the interactive display 210 shown in FIG. 2.

In the process of selecting a user selectable feature screen, the user is presented with a default feature screen selected for display while the terminal is in the idle state, a first page of optional feature screens for the display while the terminal is in the idle state, and indications of additional pages of optional feature screens for the display while the terminal is in the idle state. The user may choose from among the various optional feature screens on any page by dynamically advancing through the selections by pressing either the <Prey button 216 or Next> button 217. The user indicates his or her final choice by pressing the button 229 below the word "Done" shown in the main feature menu screen of the display 210.

Once a choice of a user selectable feature screen is made, including, if desired, exercising the option not to change the default setting, pressing the Exit key 221 changes the screen display to the feature screen selected for display while the terminal is in the idle state. Thus, regardless of the current state of the terminal, the user needs to press only one key, the Exit key 221, to reach the previously selected feature screen. While at the selected feature screen, the user may execute the feature provided by this screen or may proceed to any other screen allowed by the functionality of the telephone terminal.

Figure 3:
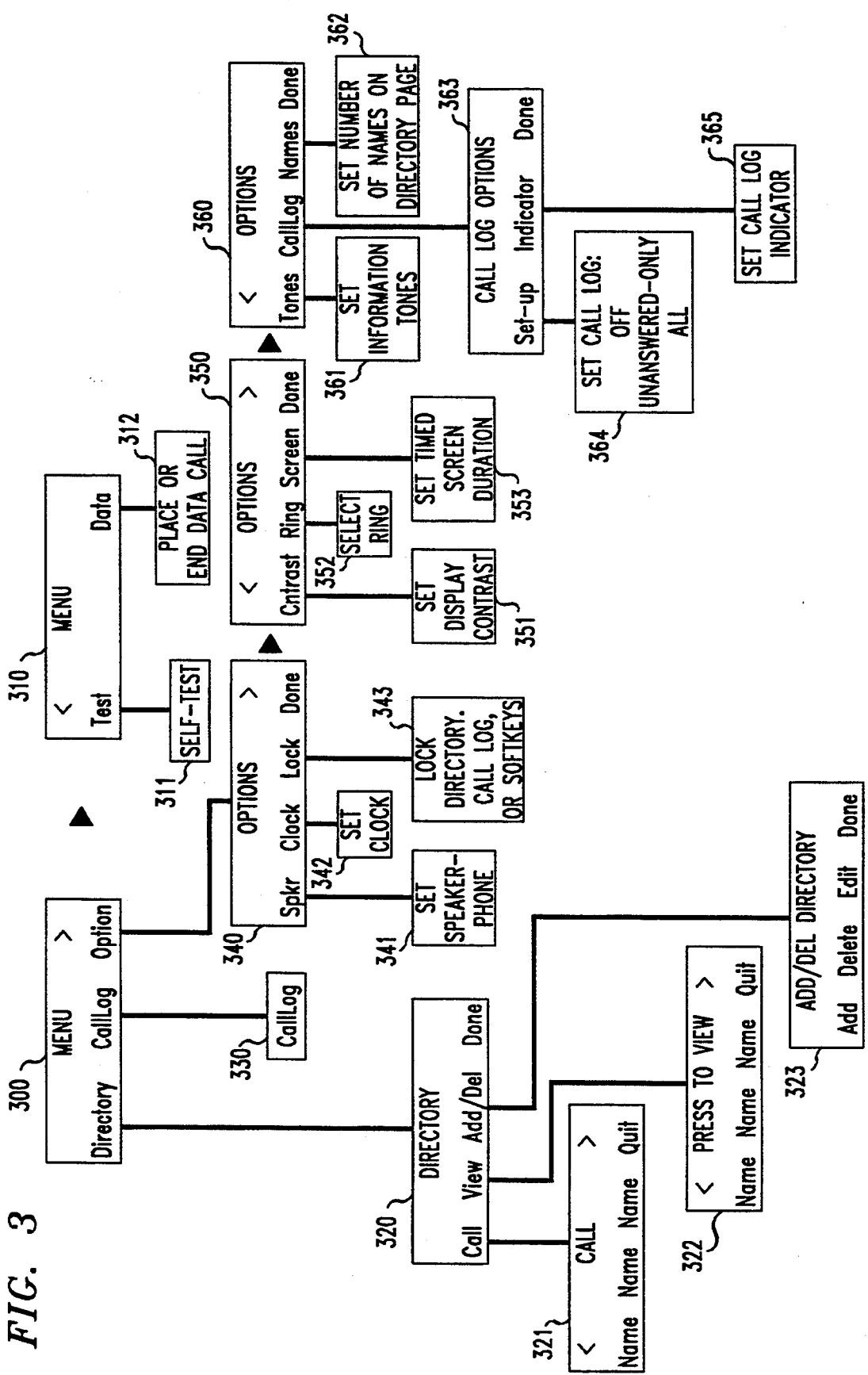
FIG. 3 is a flow chart illustrating some of the display screens provided by the circuitry shown in FIG. 1 and produced in an interactive display shown in FIG. 2 in accordance with the invention.

Referring next to FIG. 3, there is shown a flow chart for illustrating some of the display screens provided by the circuitry in FIG. 1 and produced in the interactive display 210 of FIG. 2. The sequence in which these display screens are provided is indicated by the flow chart, and is shown in sufficient detail to permit one skilled in the an to duplicate the circuitry of FIG. 1, either by programming a microprocessor or by special purpose logic circuitry such as is available in a digital signal processor.

The features accessed with the display 210 and the softkeys 226 through 229 extend from a main menu 300 which allows the user at the terminal to view and modify three different type of menu choices, Directory, CallLog and Options. The user also is able to advance directly to a status menu 310 by pressing the Next> button 217. Screens 311 and 312 are accessible from this status menu screen. By selecting the status menu, a self-test may be performed on components in the telephone terminal such as the terminal's lights, ringer, display and dial pad keys, for example. Also, a data call may be placed or ended within this menu.

In the directory menu, the user may create and edit a personal directory of, for example, 30 extensions, or outside telephone numbers. The major screens available in the directory menu are screens 320 through 323.

In the CallLog menu 330, when suitably configured, the user is able to view the 10 most recent incoming unanswered calls. A configuration option also is available which enables the user to access the 10 most recent answered calls and the 10 most recent calls placed from the terminal.

In the option menu, a number of features may be accessed. Such features as setting a speakerphone, clock and locking the directory, call log or softkeys are provided by screens 340 through 342. Other features such as selecting the display contrast, selecting a personalized ringing pattern, and setting the timed screen duration are provided by screens 350 through 353. Finally, features such as setting information tones, setting the call log options, and setting the number of names (either three or four) on each directory page are provided by screens 360 through 365.

In the operation of the invention by illustrative example, a user may prefer that the feature that he or she uses first when entering softkeys is the one which sets or recalibrates the speakerphone in accordance with, for example, the teachings of U.S. Pat. No. 4,959,857 because of acoustic conditions that vary frequently with time. If the speakerphone feature screen has been selected by the user, he or she needs only to press the Exit key 221 to change the screen display to the speakerphone feature screen. The user may then execute the calibration feature provided by this screen.

In a second illustrative example of the operation of the invention, a user may prefer that the feature that he or she uses first when entering softkeys is the feature which sets the display contrast on the display 210, because of ambient lighting conditions that vary often and unpredictably. As similarly provided in the speakerphone feature example, if the display contrast feature screen has been selected by the user, he or she needs only to press the Exit key 221 to change the screen display to the display contrast feature screen. The user may then execute the contrast setting feature provided by this screen.

What has been described is merely illustrative of the present invention. Other applications to telephone, computer or other user interactive systems other than the disclosed system are contemplated as being within the knowledge of one skilled in the art. One such application is the utilization of the Exit key 221 for identifying a second most important feature that the user wants to use when entering softkeys. This second most important feature may be chosen in the same manner as the first user selectable feature described herein above. This second most important feature may be accessed by, for example, a second depression of the Exit key 221 within a prescribed time period or by selecting a similarly dedicated key. In such an arrangement, a user could conceivably move from the add/delete directory 323 to set the speakerphone at screen 341 and then quickly go to and set the display contrast at screen 351. This application could be extended to a third and an even greater number of keys or depressions of a single key (or some combination of the two) for accessing important features all hierarchically arranged in a suitable priority selected by a user of the terminal. It is therefore to be understood that other applications may be utilized without departing from the spirit and scope of the present invention.

We claim:

1. An arrangement for configuring a telephone terminal for displaying selectable features at the terminal, the arrangement comprising:
    means for identifying each one of a plurality of selectable features available at the telephone terminal;
    means for configuring the telephone terminal for displaying each one of the plurality of selectable features one at a time;
    means for selecting by a user of the telephone terminal one of the plurality of selectable features as a default feature, the default feature being displayed when the telephone terminal is put in an idle state by a single depression of a single key on the telephone terminal after displaying any one of the plurality of selectable features, said idle state being a state in which the telephone terminal exists when none of the plurality of selectable features are being accessed by the user of the telephone terminal; and
    means for executing the default feature when the telephone terminal is put in the idle state.

2. The arrangement of claim 1 wherein the selecting means further comprises means for selecting a second one of the plurality of selectable features as a second default feature when the telephone terminal is put in the idle state.

3. The arrangement of claim 2 further comprising means for arranging the default feature and the second default feature hierarchically, the default feature having a higher priority than the second default feature.

4. A method of configuring a telephone terminal for displaying selectable features at the telephone terminal, the method comprising the steps of:
    identifying each one of a plurality of selectable features available at the telephone terminal;
    configuring the telephone terminal for displaying each one of the plurality of selectable features one at a time;
    selecting by a user of the telephone terminal one of the plurality of selectable features as a default feature, the default feature being displayed when the telephone terminal is put in an idle state by a single depression of a single key on the telephone terminal after displaying any one of the plurality of selectable features said idle state being a state in which the telephone terminal exists when none of the plurality of selectable features are being accessed by the user of the telephone terminal; and
    executing the default feature when the telephone terminal is put in the idle state.

5. The method of claim 4 wherein the selecting step further comprises the step of selecting a second one of the plurality of selectable features as a second default feature when the telephone terminal is put in the idle state.

6. The method of claim 5 further comprising the step of arranging the default feature and the second default feature hierarchically, the default feature having a higher priority than the second default feature.

* * * * *